United States Patent
Rhinefrank et al.

(10) Patent No.: US 9,484,779 B2
(45) Date of Patent: Nov. 1, 2016

(54) MECHANICAL ASSEMBLY FOR MAINTAINING AN AIR GAP BETWEEN A STATOR AND ROTOR IN AN ELECTRO-MECHANICAL ENERGY CONVERTER

(75) Inventors: Kenneth Edward Rhinefrank, Corvallis, OR (US); Joseph Prudell, Corvallis, OR (US); Alphonse Schacher, Corvallis, OR (US); Erik Hammagren, Corvallis, OR (US)

(73) Assignee: Columbia Power Technologies, Inc., Charlottesville, VA (US)

( * ) Notice: Subject to any disclaimer, the term of this patent is extended or adjusted under 35 U.S.C. 154(b) by 165 days.

(21) Appl. No.: 14/009,705

(22) PCT Filed: Apr. 4, 2012

(86) PCT No.: PCT/US2012/032120
§ 371 (c)(1),
(2), (4) Date: Dec. 3, 2013

(87) PCT Pub. No.: WO2012/138725
PCT Pub. Date: Oct. 11, 2012

(65) Prior Publication Data
US 2014/0084590 A1    Mar. 27, 2014

Related U.S. Application Data

(60) Provisional application No. 61/471,690, filed on Apr. 4, 2011.

(51) Int. Cl.
*F03B 13/10* (2006.01)
*F03B 13/12* (2006.01)
(Continued)

(52) U.S. Cl.
CPC .............. *H02K 1/28* (2013.01); *F03B 13/1815* (2013.01); *H02K 1/2753* (2013.01); *H02K 1/30* (2013.01);
(Continued)

(58) Field of Classification Search
CPC ............ H02K 1/27; H02K 1/28; H02K 1/30; H02N 2/10; H02N 2/12
USPC .................. 290/42, 53; 310/156.16
See application file for complete search history.

(56) References Cited

U.S. PATENT DOCUMENTS 4,482,097 A * 11/1984 Stone ................ H02K 7/14
                                                      241/101.2
5,105,658 A *  4/1992 Jaafar .................... G01R 31/34
                                                      73/865.8
(Continued)

FOREIGN PATENT DOCUMENTS

EP            0627805 A2   12/1994
JP       2002325412 A      11/2002
(Continued)

*Primary Examiner* — Tulsidas C Patel
*Assistant Examiner* — Thomas Quigley
(74) *Attorney, Agent, or Firm* — Pierce Atwood LLP; Kevin M. Farrell

(57) ABSTRACT

An apparatus and corresponding method for maintaining an air gap between a stator and rotor in an electro-mechanical energy converter is provided. The apparatus includes a structural sleeve and a plurality of stator sections attached to an inner surface of the structural sleeve. A hub is enclosed by the structural sleeve and is concentric with the structural sleeve. A plurality of rotor sections is flexibly coupled to the hub and is enclosed by the structural sleeve. A rail system is positioned within the structural sleeve and is concentric with the structural sleeve. The rail system guides the rotor sections in a substantially circular path and defines an air gap between the plurality of stator sections and plurality of rotor sections.

26 Claims, 18 Drawing Sheets

(51) Int. Cl.
*H02K 1/28* (2006.01)
*F03B 13/18* (2006.01)
*H02K 1/27* (2006.01)
*H02K 1/30* (2006.01)
*H02K 7/08* (2006.01)
*H02K 7/18* (2006.01)
*H02K 9/22* (2006.01)
*H02K 1/14* (2006.01)

(52) U.S. Cl.
CPC ............ *H02K 7/088* (2013.01); *H02K 7/1838* (2013.01); *H02K 9/22* (2013.01); *H02K 1/148* (2013.01); *H02K 2201/03* (2013.01); *H02K 2213/12* (2013.01); *Y02E 10/38* (2013.01); *Y02E 10/725* (2013.01)

(56) References Cited

U.S. PATENT DOCUMENTS

| | | | | |
|---|---|---|---|---|
| 5,563,357 | A * | 10/1996 | Longree | F16L 55/26 73/865.9 |
| 6,899,075 | B2 * | 5/2005 | Saint-Hilaire | F02B 55/14 123/241 |
| 2003/0127065 | A1 * | 7/2003 | Stephan | F01L 1/3442 123/90.17 |
| 2003/0230941 | A1 * | 12/2003 | Jacobs | B60L 15/38 310/12.19 |
| 2004/0232796 | A1 * | 11/2004 | Weissensteiner | H02K 1/146 310/216.001 |
| 2006/0097582 | A1 | 5/2006 | Engstrom | |
| 2009/0206684 | A1 * | 8/2009 | Jajtic | H02K 41/031 310/12.31 |
| 2010/0007225 | A1 | 1/2010 | Platon et al. | |
| 2010/0213710 | A1 | 8/2010 | Rhinefrank et al. | |
| 2012/0068567 | A1 * | 3/2012 | Plata | H02K 1/30 310/156.08 |

FOREIGN PATENT DOCUMENTS

| | | |
|---|---|---|
| SE | 0950897 A1 | 2/2011 |
| WO | 2006068042 A1 | 6/2006 |
| WO | 2010096195 A1 | 8/2010 |
| WO | 2011065893 A1 | 6/2011 |

* cited by examiner

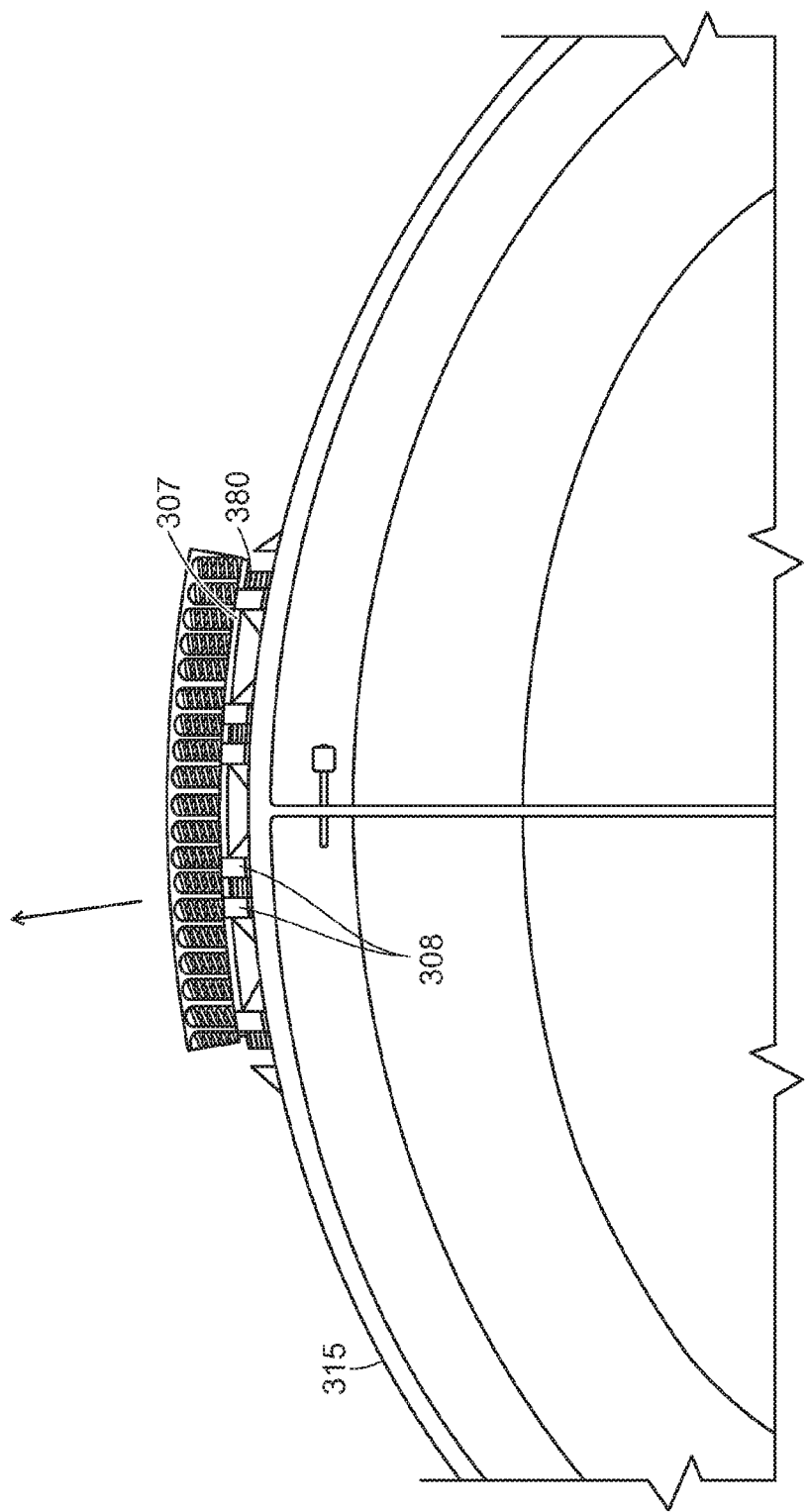

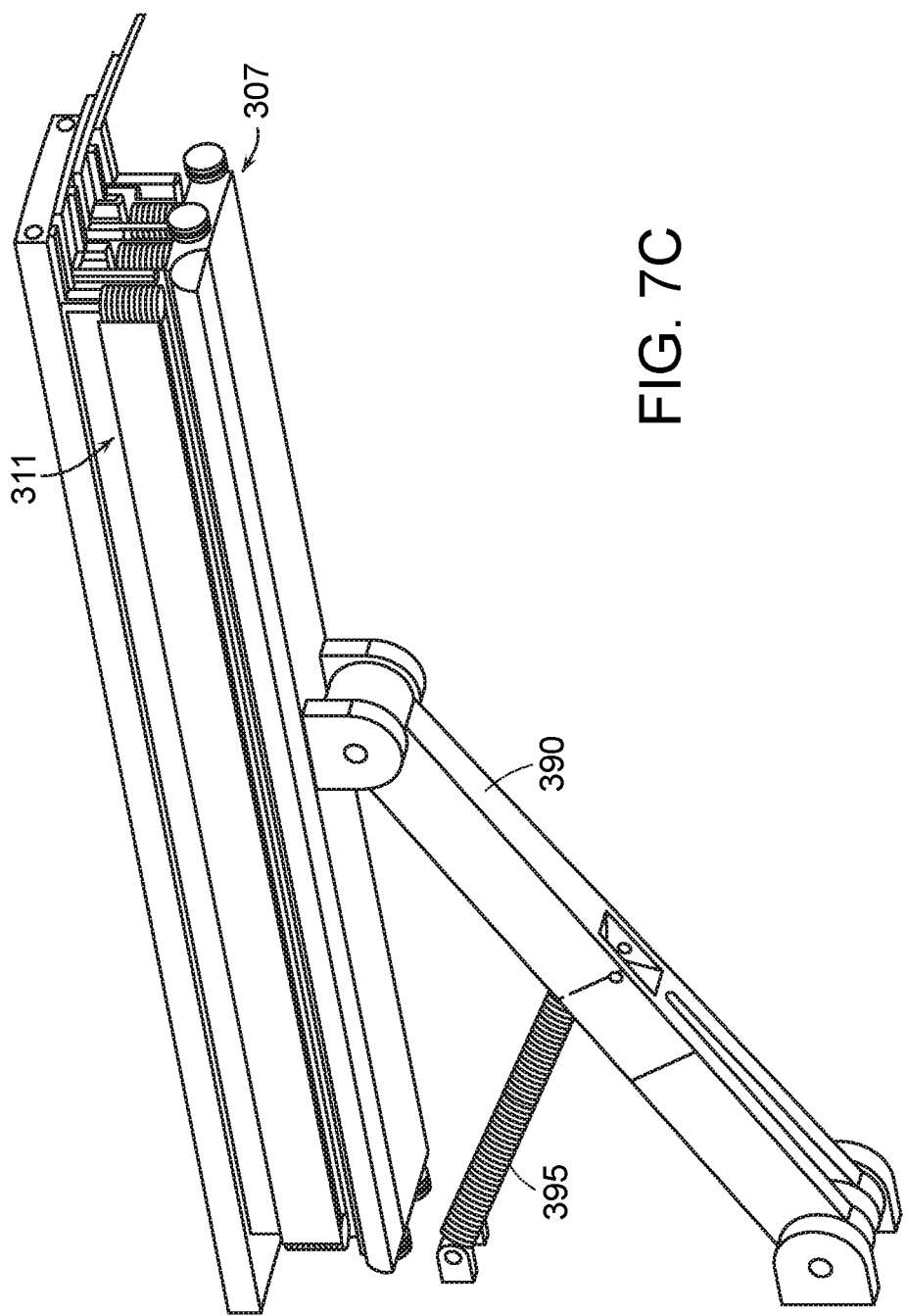

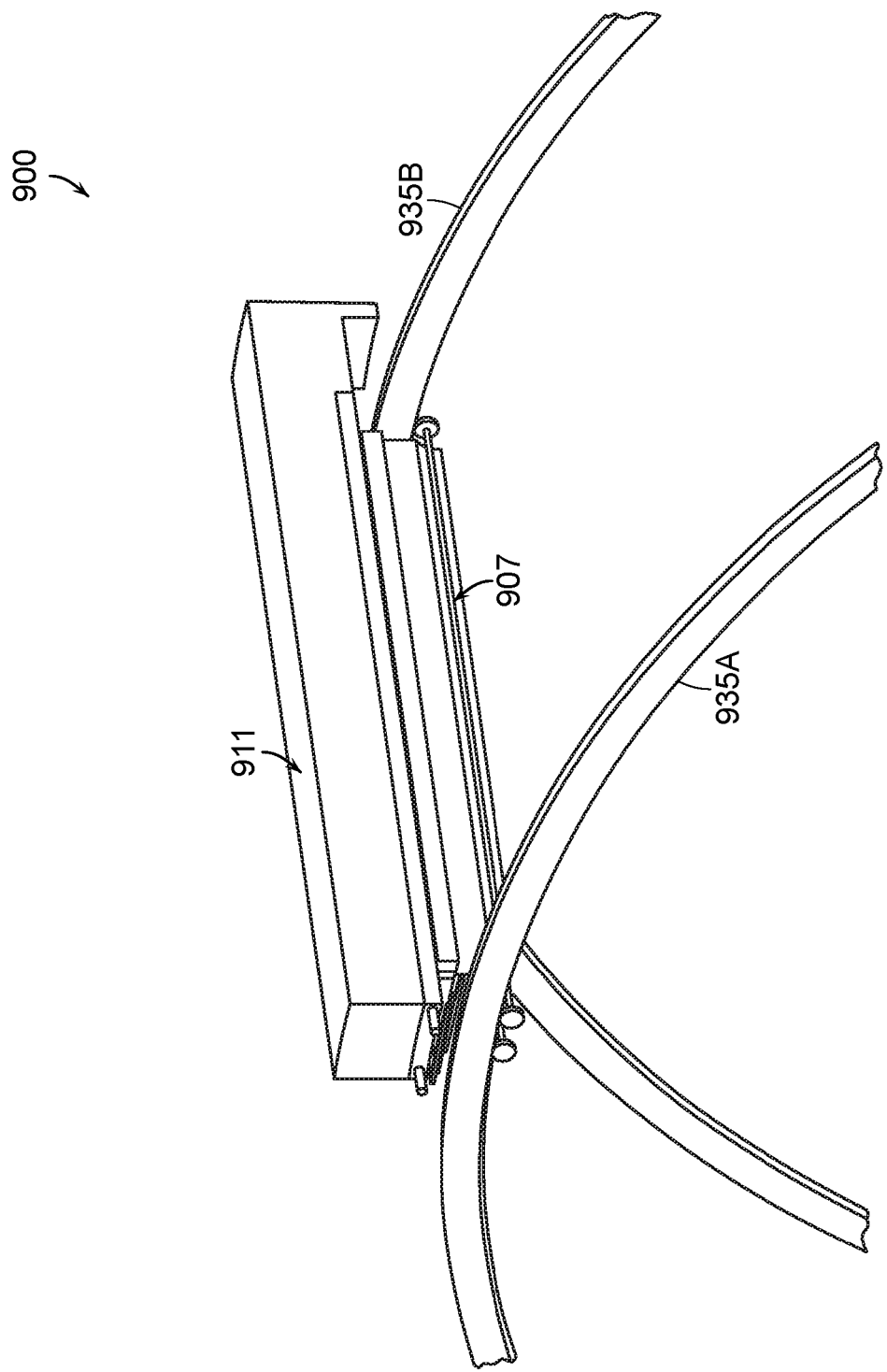

MECHANICAL ASSEMBLY FOR MAINTAINING AN AIR GAP BETWEEN A STATOR AND ROTOR IN AN ELECTRO-MECHANICAL ENERGY CONVERTER

BACKGROUND

1. Field of the Invention

The present invention relates generally to electro-mechanical energy converters.

2. Discussion of Background Information

One type of electro-mechanical energy converter, called an "electric motor," converts electric energy into mechanical work. Another type of electro-mechanical energy converter, called an "electric generator," converts mechanical work into electric energy. Both types of electro-mechanical energy converters come in a range of sizes and are often interchangeable in operation, which is to say that a motor can act as a generator and vice versa when the process is reversed. In all cases, mechanical work is required to drive an electric generator that can come from a variety of sources, amongst which is the work provided by ocean waves.

Motors and generators typically operate at high speed (1000 to 4000 rpm) and low torque because this combination reduces the overall cost to manufacture for a given power level. The relatively slow speed and large forces from ocean waves result in challenging requirements for electro-mechanical energy conversion. Direct mechanical coupling of these low speed (less than 5 rpm revolution per minute) and high torque (millions of Newton-meter) mechanical forces and converting it to electrical energy can be efficiently and cost effectively achieved with a large-diameter direct-drive generator. This direct coupling requires that certain electromagnetic and mechanical design challenges be addressed.

A common industry practice to address low-speed and high torque motor/generator requirements is to increase diameter. An increase in diameter improves both efficiency and reduces the unit material cost for the same torque delivered by the motor/generator. Torque is improved by a large diameter machine due to the increased machine radius and a longer lever arm acting on the same electromagnetic force.

In a conventional design, a generator/motor consists of two primary components: a fixed element, called a "stator," against which a rotational element, called a "rotor" electromagnetically reacts. The stator and rotor are separated by a small radial clearance (air gap) that provides mechanical clearance between the moving parts. Through numerous machine design types, understood by those skilled in the art, magnetic flux is directed through the air gap between stator and rotor and through one or more sets of metallic coils. The relative rotation between stator and rotor causes a time rate of change of the magnetic flux through the metallic coils and generates voltage directly proportional to that rate of change. The time rate of change of magnetic flux can be increased either by faster rotation at the air gap and/or by higher flux density. For a given rotational speed, the velocity is proportional to the radius, which means that the larger the diameter of the generator/motor, the faster the relative motion between the rotor and stator at the air gap. It can be shown that when all other machine parameters are assumed constant a higher speed translates into higher flux velocity and improved generator efficiency.

As the diameter of an electro-mechanical energy converter increases, the ability to manufacture these parts precisely (i.e., with smaller or "tighter" tolerances) and therefore the ability to maintain a small air gap becomes increasingly difficult and more expensive. Tolerances of approximately 5 to 10 millimeters (mm) have been achieved with existing large diameter direct-drive generators/motors. Large air gaps, such as 5 to 10 mm, decrease the efficiency (and/or increase the cost) of a motor/generator.

A need therefore exists for an increased motor/generator diameter and a need for a design that allows this large diameter with a reduced air gap (e.g., 0.5 mm to 3 mm) between stator and rotor in an electro-mechanical energy converter.

SUMMARY

Example embodiments of the present invention provide a mechanical assembly for maintaining an air gap between a stator and rotor in an electro-mechanical energy converter. In one embodiment, the mechanical assembly includes a structural sleeve serving as a frame that concentrically arranges other components of the assembly and enclosing these components. A plurality of stator sections is attached to an inner surface of the structural sleeve. A plurality of rotor sections is flexibly coupled to a hub. The hub transfers torque to or from the rotor sections in an electro-mechanical energy conversion process. A rail system, which may comprise two axially separated rails, is positioned within the structural sleeve. The rail system guides the rotor sections in a substantially circular path. The rail system also defines an air gap between the plurality of stator sections and plurality of rotor sections.

In another aspect, the present invention provides a method for maintaining an air gap between a stator and rotor in an electro-mechanical energy converter. In one embodiment, the method includes providing a structural sleeve and attaching a plurality of stator sections to an inner surface of the structural sleeve. The method includes providing a hub that is enclosed by the structural sleeve and is concentric with the structural sleeve. The method includes flexibly coupling a plurality of rotor sections to the hub. The plurality of rotor sections being flexibly coupled is enclosed by the structural sleeve. The method includes positioning a rail system within the structural sleeve. The rail system being so positioned guides the rotor sections in a substantially circular path and to define an air gap between the plurality of stator sections and plurality of rotor sections. The rail system is concentric with the structural sleeve.

BRIEF DESCRIPTION OF THE DRAWINGS

One will better understand these and other features, aspects, and advantages of the present invention following a review of the description, appended claims, and accompanying drawings in which:

FIGS. 7A-7C are diagrams of a rotor section flexibly coupled to a hub according to example embodiments of the present invention.

FIGS. 9A-9C are diagrams of an example permanent magnetic generator according to one embodiment of the present invention.

DETAILED DESCRIPTION

Figure 1A:
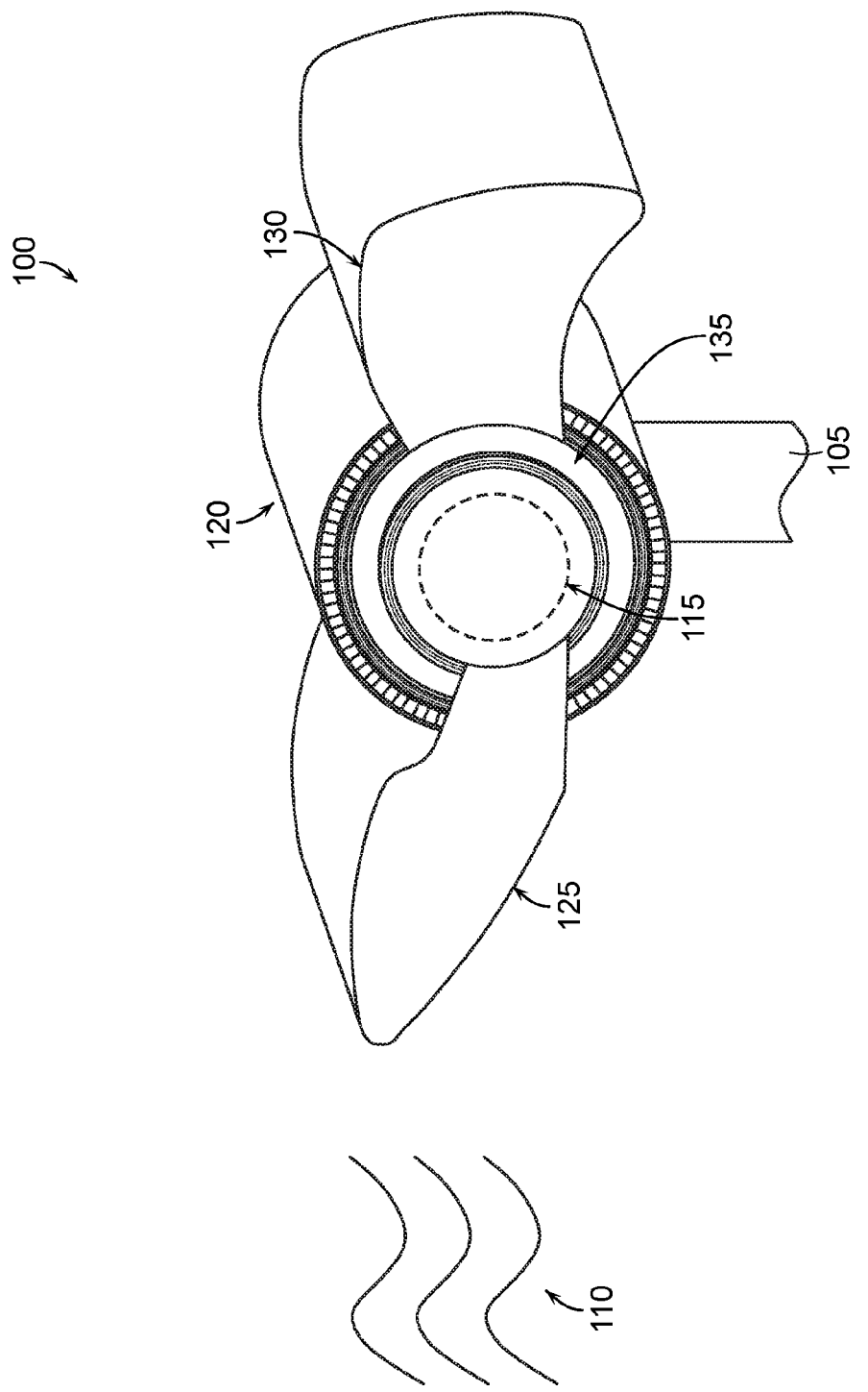
FIGS. 1A-1C are diagrams of an example electro-mechanical energy converter environment.
Figure 1B:
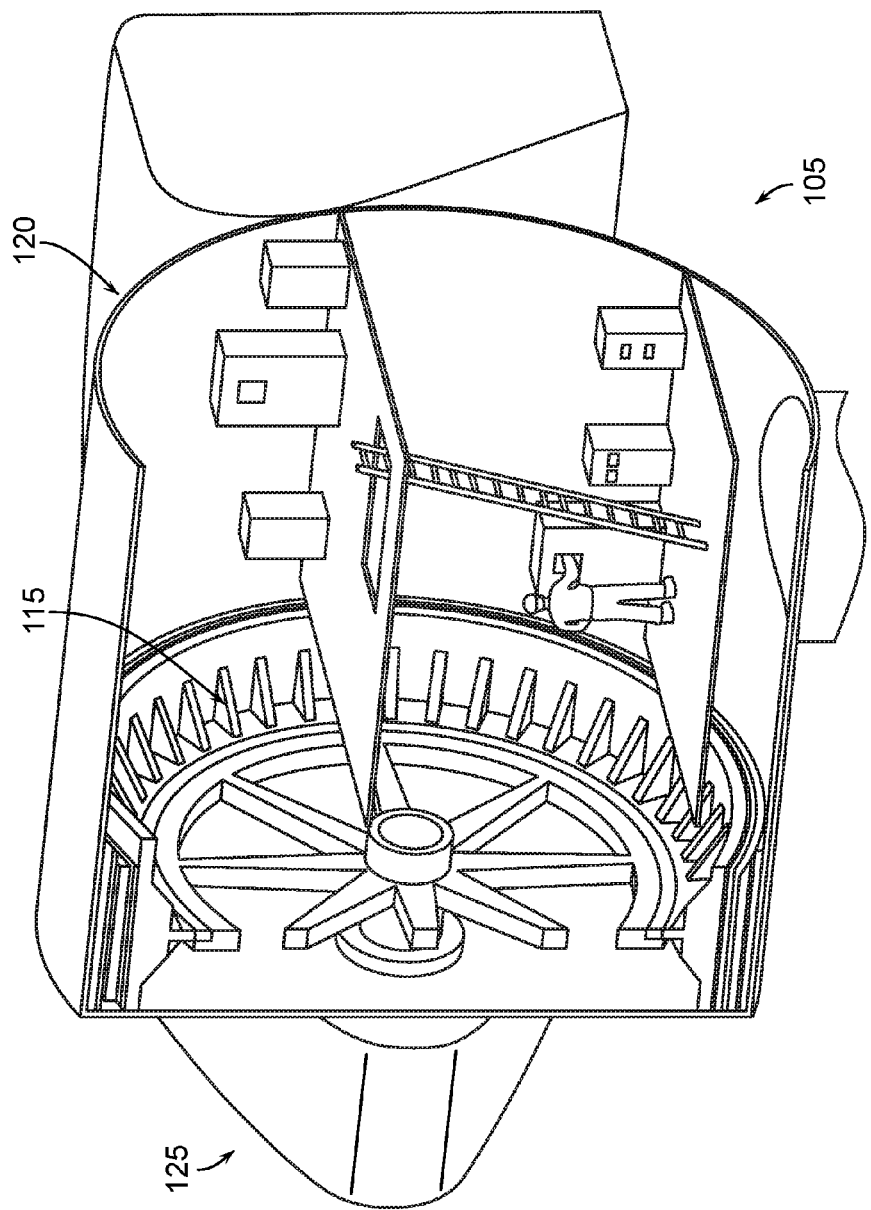
Figure 1C:
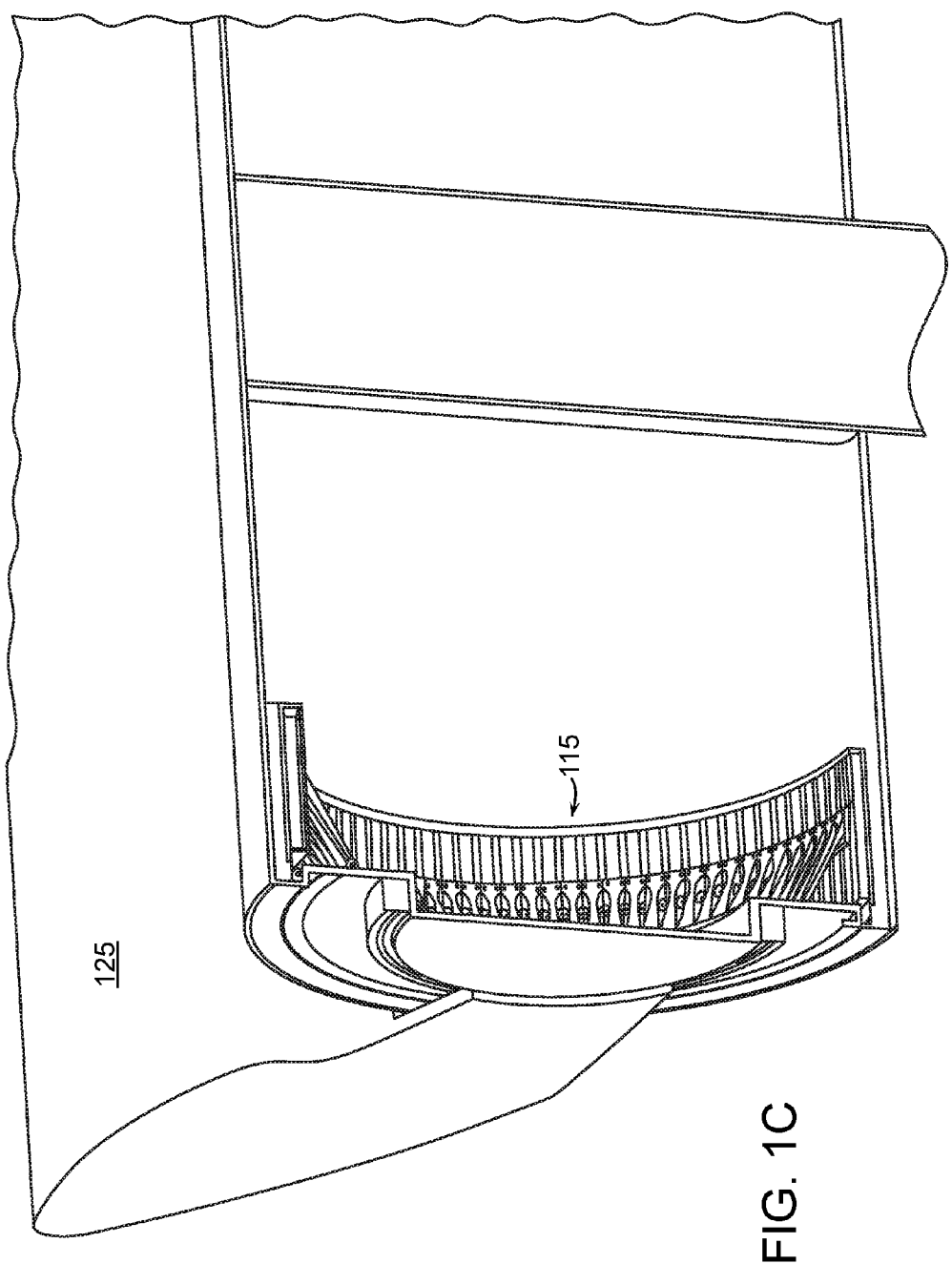

FIGS. 1A-C show an example electro-mechanical energy converter environment 100 including a wave energy converter (WEC) 105 and waves 110. The WEC 105 includes an electro-mechanical energy converter 115, as shown in relation to a nacelle 120, rotatable forward float 125 and rotatable aft float 130. The electro-mechanical energy converter 115 is disposed concentrically with the longitudinal central axis and at an end of the nacelle 120. In a wave energy extraction process, waves 110 interact with the floats 125, 130, which in turn rotate a drive hub 135 in a reciprocating manner with the rise and fall of the waves 110. The drive hub 135 rotates a rotor (not shown) of the electro-mechanical energy converter 115 to generate electricity.

Figure 2:
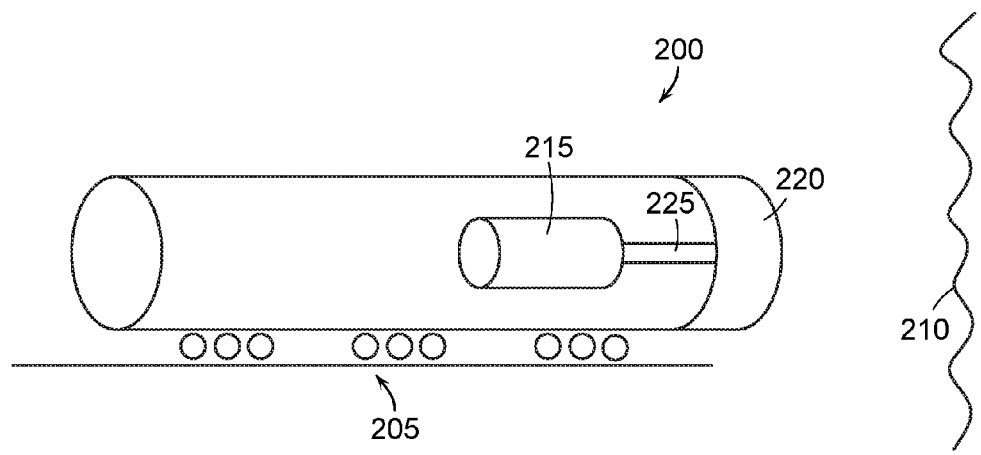
FIG. 2 is a diagram of an example electro-mechanical energy converter environment.

FIG. 2 shows example electro-mechanical energy converter environment 200 including a tunnel boring machine 205 and rock face 210. The tunnel boring machine 205 includes an electro-mechanical energy converter 215, cutter head 220, and driveshaft 225 connecting the electro-mechanical energy converter 215 and cutter head 220. In a tunnel boring process, the electro-mechanical energy converter 215 uses electricity to turn a rotor (not shown) of the electro-mechanical energy converter 215. The rotor turns the driveshaft 165 which in turn rotates the cutter head 220. The rotating cutter head 220 engages the rock face 210 breaking off chunks of rock, which are then conveyed away leaving a hole to form a tunnel. In contrast to the WEC 105 discussed above, the rotation of the cutter head 220 is not reciprocating but rather is run in a continuous manner in both forward and reverse directions.

The electro-mechanical energy converter 115 of the WEC 105 (which is a type of electric generator) and the electro-mechanical energy converter 215 of the tunnel boring machine 205 (which is a type of electric motor) share the characteristics of being large in size (e.g., 5 to 10 meters (m) in diameter or greater), high torque (e.g., several million Newton-meters), and slow speed (e.g., 1 revolution per minute). These characteristics present challenges to the mechanical design of such electro-mechanical energy converters.

Figure 3A:
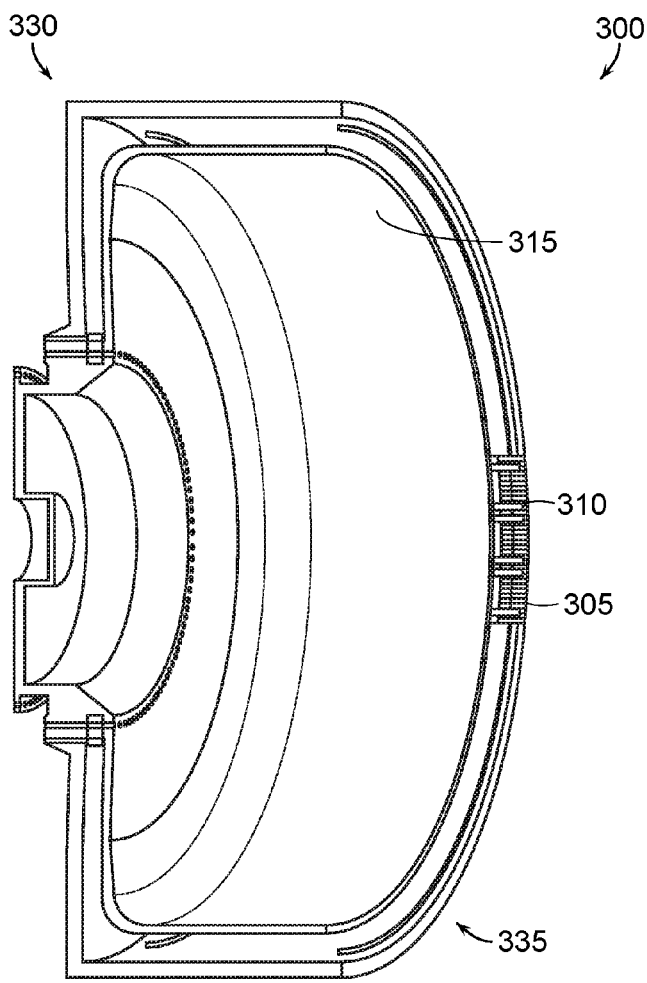
FIGS. 3A and 3B are cross sectional views of an electro-mechanical energy converter according to one embodiment of the present invention.
Figure 3B:
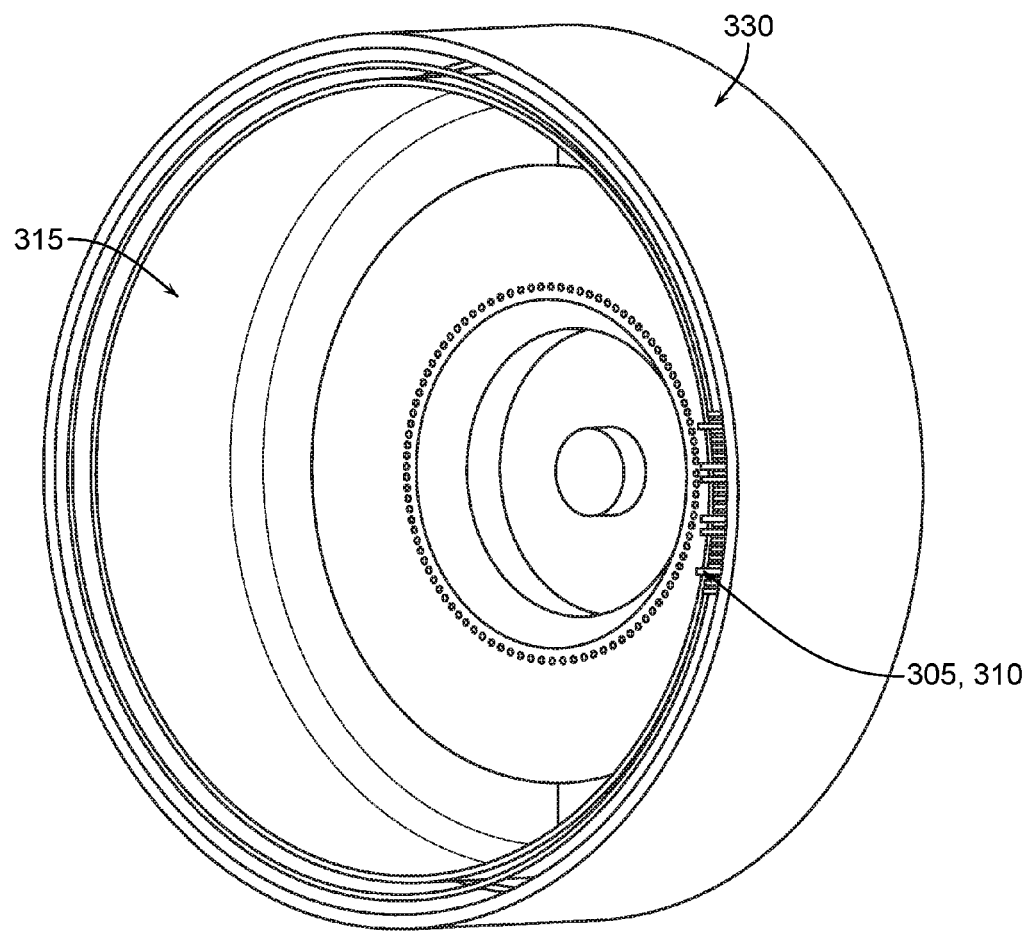

As depicted in the cross sectional side view of FIG. 3A and the cross section end view of FIG. 3B, one embodiment of an electro-mechanical energy converter 300 comprises a rotor 305, a stator 310, a drive hub 315 for driving the rotor 305, a rail system 335 on which the rotor 305 travels, and an outer structural sleeve 330 that encloses the foregoing components, as well as other components of the electro-mechanical energy converter 300.

Figure 4:
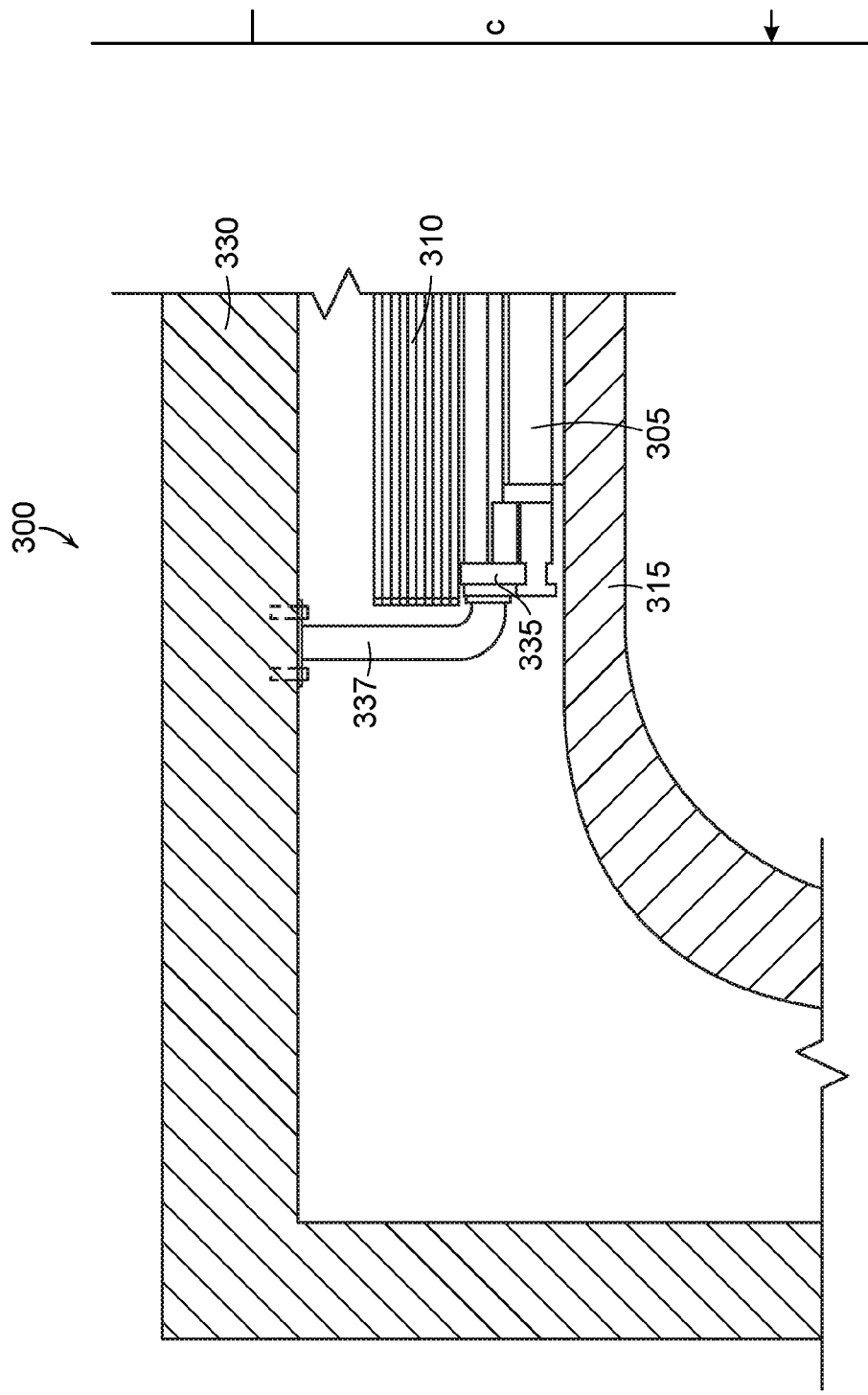
FIG. 4 is a cross sectional view of one end of an electro-mechanical energy converter according to one embodiment of the present invention.

In one example shown in FIG. 4, the stator 310 is attached to the outer structural sleeve 330, which serves as the assembly frame of the electro-mechanical energy converter 300. The stator 310 is comprised of between 40 and 80 stator sections 311 that make up a full 360 degree circumference of the electro-mechanical energy converter 300 or portion thereof. In a convenient embodiment, each of the stator sections 311 has a section length of approximately 300 mm and an axial length between 1 to 2 m.

Figure 5A:
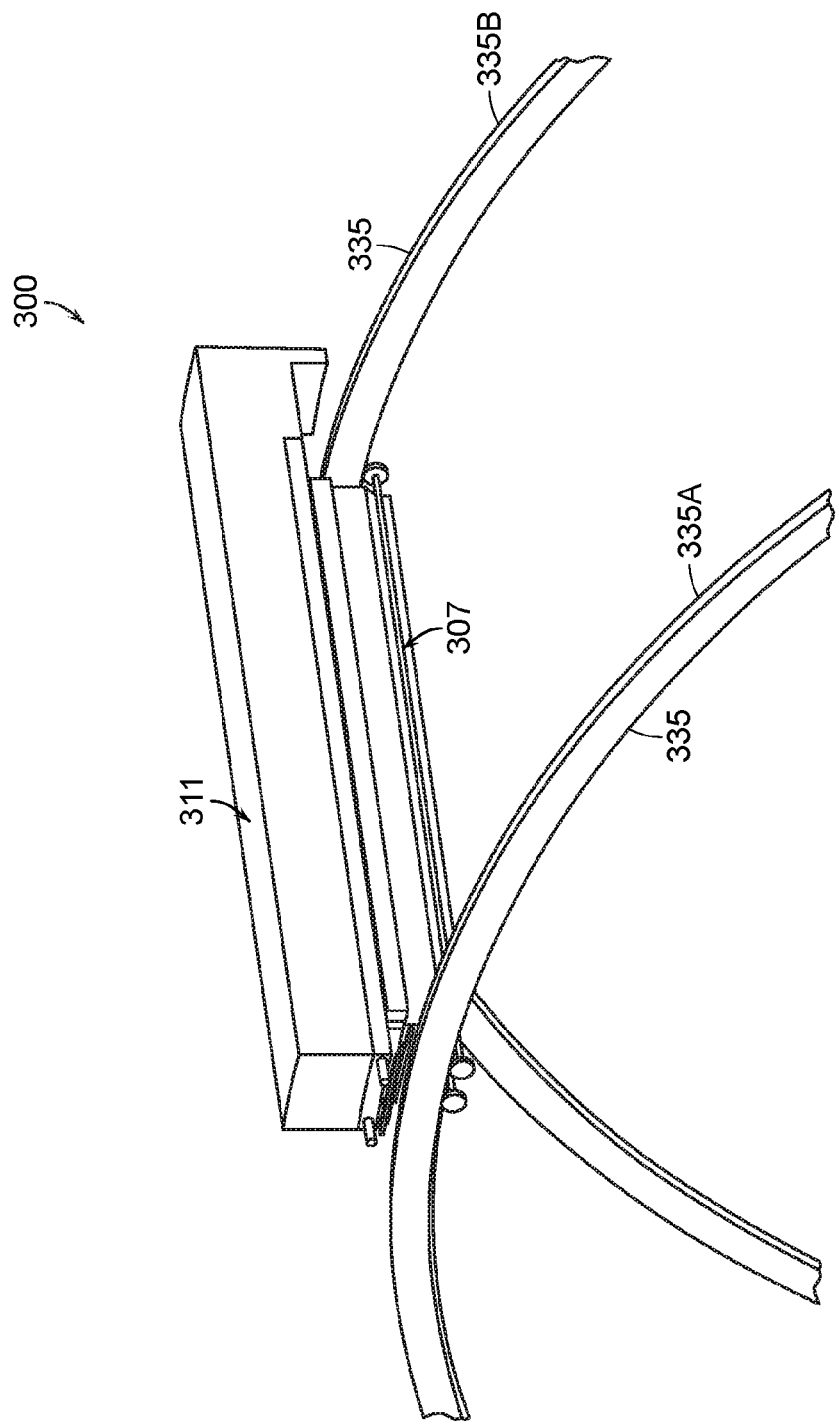
FIGS. 5A-5C are diagrams of a rail system and car design according to one embodiment of the present invention.
Figure 5B:
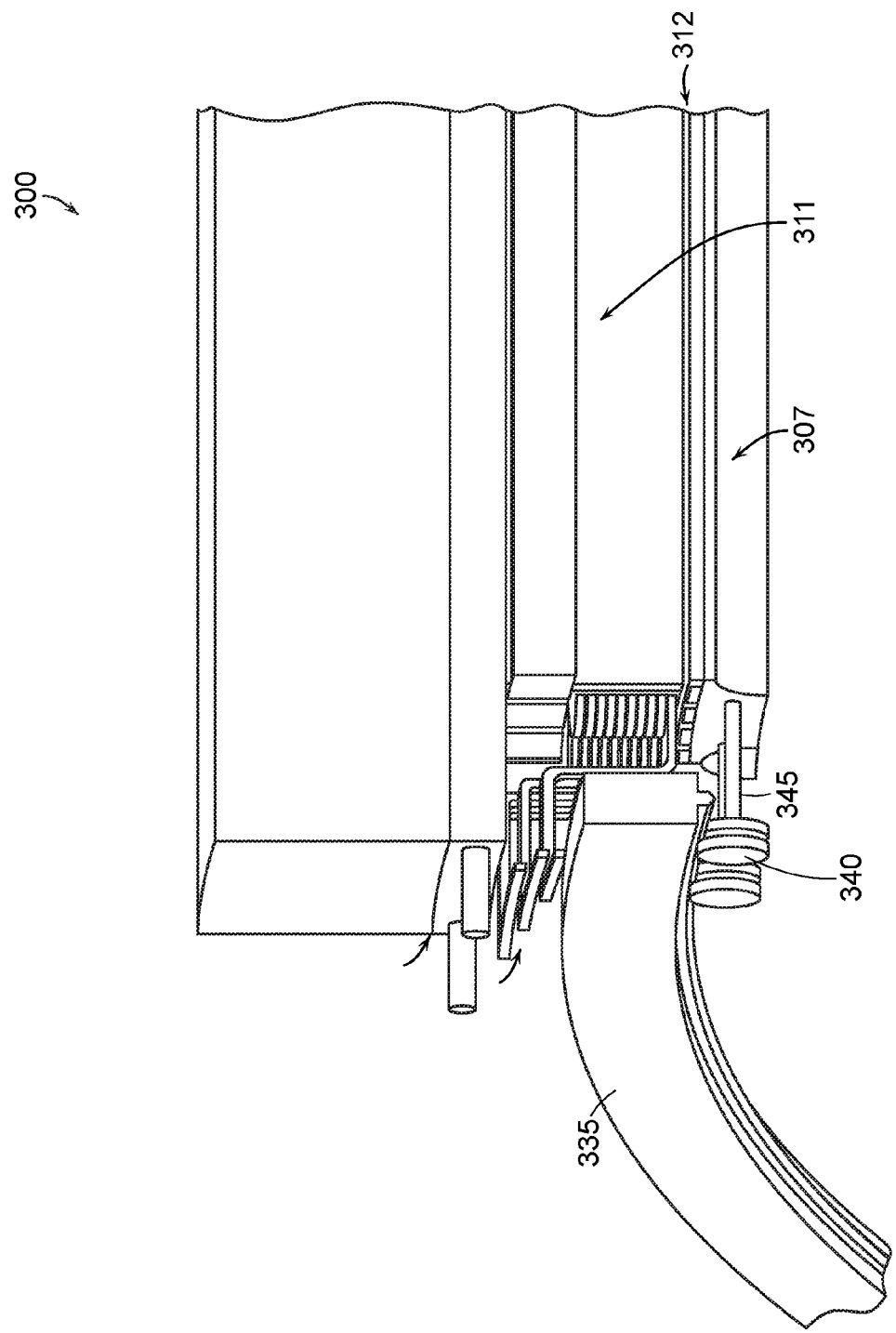
Figure 5C:
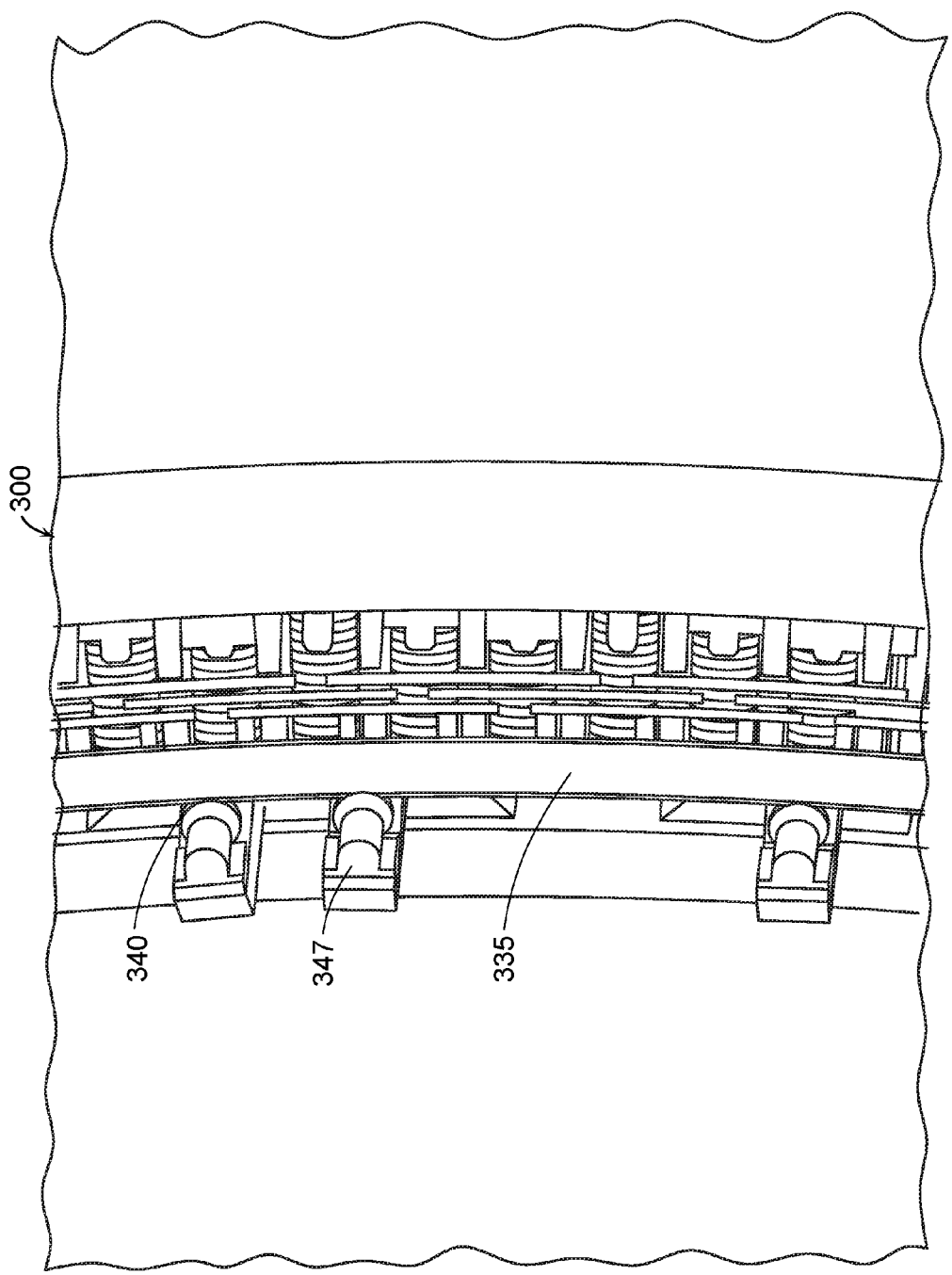

In one embodiment depicted in FIGS. 5A-5C, the electro-mechanical energy converter 300 comprises a "rail and car" system design rather than a conventional fixed rotor design. In a conventional electro-mechanical energy converter, the rotor is a fixed and precisely-machined rotary cylinder, and the rotor must spin within the stator, which is a precisely machined cylindrical bore. As the diameter of an electro-mechanical energy converter increases, tolerances must be increased to prevent the rotor (cylinder) from impacting the stator (bore). These increases in tolerance translate into a less efficient (and/or more expensive) design. The rail and car system of the electro-mechanical energy converter 300 enables a substantial reduction in the clearance between the rotor 305 and stator 310, which leads to major advantages discussed below with regard to functionality.

In an example embodiment, the electro-mechanical energy converter 300 comprises a pair of rails 335A, 335B (as labeled in FIG. 5A and collectively referenced as 335) at the extreme axial ends of the stator 310. The rails 335 are positioned between the rotor 305 and stator 310. In a convenient embodiment shown in FIG. 4, each rail 335 is attached to either end of the structural sleeve 330 by supports 337. In another embodiment, the rail 335 is attached to the stator 310. In other embodiments, the electro-mechanical energy converter 300 incorporates a single rail (monorail system) or a plurality of rails (multi-rail system). In some of the foregoing rail systems, the rails 335 are made up of several sections, which may be arranged with or without gaps between the sections. For example, there may be gaps between the sections of rail to accommodate for expansion and contraction of individual sections. The sectional design of the rails 335 also facilitates their manufacture (e.g., machined to a tighter tolerance), assembly, and installation.

In a convenient embodiment, each rail 335 is a track that approximates a circle or portion thereof (i.e., an arc) but need not be perfect. Such an imperfect circle or portion thereof is expected with a large diameter electro-mechanical energy converter because of difficulty in achieving small machine tolerances, exposure to massive loads, thermal expansion and contraction of all components.

In the rail and car design described herein, the structural sleeve 330, stator 310, and/or rail 335 are designed such that machined tolerances between the face of the stator 310 and the running surface of the rail 335 are achieved through the application of localized machine tolerances in which the stator 310, rail 335, and/or rotor 305 interfaces occur.

As depicted in FIGS. 5A and 5B, the rotor 305 in the rail and car design is not a rigid cylinder but is instead comprised of a large number of smaller rotor sections 307. The rotor sections 307 are arranged end to end to form a substantially complete circle. In one example embodiment, the rotor 305 is comprised of between 40 and 80 rotor sections 307 that complete a full 360 degree circumference of the electro-mechanical energy converter 300.

The rotor sections 307 follow the rail 335. Because the rail 335 may not be a perfect circle, as described above, the path followed by the rotor sections 307 may not be a perfect circle as well. This design accommodates any non-circular characteristic that is inherent to a large diameter electro-mechanical energy converter or any non-circular characteristic that is experienced by a large diameter electro-mechanical energy converter during operation, such as load, and thermal expansion and contraction of components.

In some applications, such as a wave energy converter 105 of FIGS. 1A-1C, the rotation of the electro-mechanical energy converter 115 is limited to less than 360 degrees. For example, the forward float 125 would rise and reach a maximum position of 45 degrees clockwise (CW) from horizontal and then fall counterclockwise (CCW) to a position that is 45 degrees below horizontal. This cyclic CW and CCW operation continually repeats to produce electricity. Thus, the full range of motion of the forward float 125 and drive hub 135 would be limited to 90 degrees, which also limits the range of the electro-mechanical energy converter 115 motion to 90 degrees in this example application. This range of motion can be limited by either mechanical end stops on the wave energy converter 105 or by electronic controls of the electro-mechanical energy converter 115.

In applications where a limited range of rotation exists, the electro-mechanical energy converter 300 may be designed without a complete 360 degrees of components. This reduced size might be implemented to reduce cost or to accommodate other mechanical clearance requirements. In such a design, the rail 335 of FIG. 5A, for example, is designed to be 350 degrees in length with enough stator sections 311 to achieve 350 degrees of stator 310 length while designing the number of rotor sections 307 to achieve a rotor 310 length of 260 degrees. This configuration would allow the rotor 305 a CW to CCW range of motion limited to 90 degrees between extreme ends of the rail 335 or stator 310. The circular length (circumference), or arc length, of the electro-mechanical energy converter 300 could range between 10 degrees and 360 degrees depending on the application.

In a convenient embodiment shown in FIG. 5B, each of the rotor sections 307 is supported by four wheels 340. As shown, two wheels 340 ride on one rail 335A and the other two wheels 340 ride on the other rail 335B. This rotor section and wheel configuration can be thought of as a car that rides on two tracks (for example, a train or rollercoaster). A rotor axle 345 supports each rotor wheel 340 and is held in place by an axle bearing 347 (shown in FIG. 5C). The axle bearing 347 holds a tight radial tolerance but allows for axial play in the system; that is to say, the rotor axle 345 is allowed to slide in the axial direction to allow for axial variance in the construction of the electro-mechanical energy converter 300.

In another embodiment, the rail 335 may provide a sliding surface (bearing surface) and a low friction guide is attached to the rotor 305 to control tolerance between stator 310 and rotor 305. In another embodiment, the rail 335 may be machined with a bearing race and a roller bearing assembly is attached to the rotor sections 307 to control tolerance between stator 310 and rotor 305.

In the configuration shown in FIG. 5B, the space (air gap) between the rotor 305 and stator 310 is controlled by the mechanical tolerances of the rail 335 and the rotor-wheel 340. Because the mechanical size of each of the rotor sections 307 is small (on the order of 0.5 m), controlling the clearances and tolerances between the stator and rotor is easier to achieve. A tight tolerance between the rotor car wheels 340 and face of each of the rotor sections 307 is in a range of 0.25 mm (i.e., 0.010"), which results in a substantially reduced air gap 312 of approximately 1 mm for the electro-mechanical energy converter 300 having a diameter of approximately 10 m.

A reduced air gap 312 allows for reduced air gap reluctance and increased magnetic circuit permeability, which in turn reduces the amount of magnetic material (permanent or electromagnetic) for a given electro-mechanical energy converter rating. For example, in the linear range of magnetic circuit design, a 1 mm air gap will require 10 times less magnetic material than a machine that has a 10 mm air gap.

A reduction in air gap reduces overall magnetic circuit reactance, which improves the power factor of the electro-mechanical energy converter 300 and stabilizes the operational performance of a variable frequency machine, such as the WEC 105 FIG. 1A and tunnel boring machine 205 of FIG. 2.

The tolerances of the rotor wheels 340 and/or rails 335 can be easily machined using smaller cost-effective computer numerically controlled (CNC) machine tools. One result of the foregoing rail and car design is the allowance for a small air gap between stator 310 and rotor 305 even when size of the electro-mechanical energy converter becomes very large (e.g., greater than 5 to 10 m in diameter). As discussed below in more detail, this reduction in air gap consequentially leads to a cost reduction. The reduction in air gap 312 is further improved by the tight tolerance between the face of the stator and contact surface of the rail. In one embodiment, the rail 335 is attached to the stator 310 and the tolerance between the two elements is 0.25 mm (0.010 inch). This technique of controlling air gap tolerance can apply to all sizes and types of electro-mechanical energy converters, for example, converters less than 1 m in diameter.

Examples of possible electro-mechanical energy converters (i.e., electric motors and generators) include both alternating current (AC) and direct current (DC) electro-mechanical energy converters. Within the general classification of AC and DC electro-mechanical energy converters, a multitude of electromagnetic designs exist, all of which may benefit from the examples described herein, and includes designs, such as but not limited to brushed DC, brushless DC, shunt wound, separately excited, series wound, compound wound, single phase, three phase, poly phase, synchronous, asynchronous, axial flux, radial flux, transverse flux, permanent magnet, shaded pole, reluctance, switched reluctance, coreless, ironless, squirrel cage, induction, doubly fed induction, singly fed electric, doubly fed electric, etc.

Figure 6A:
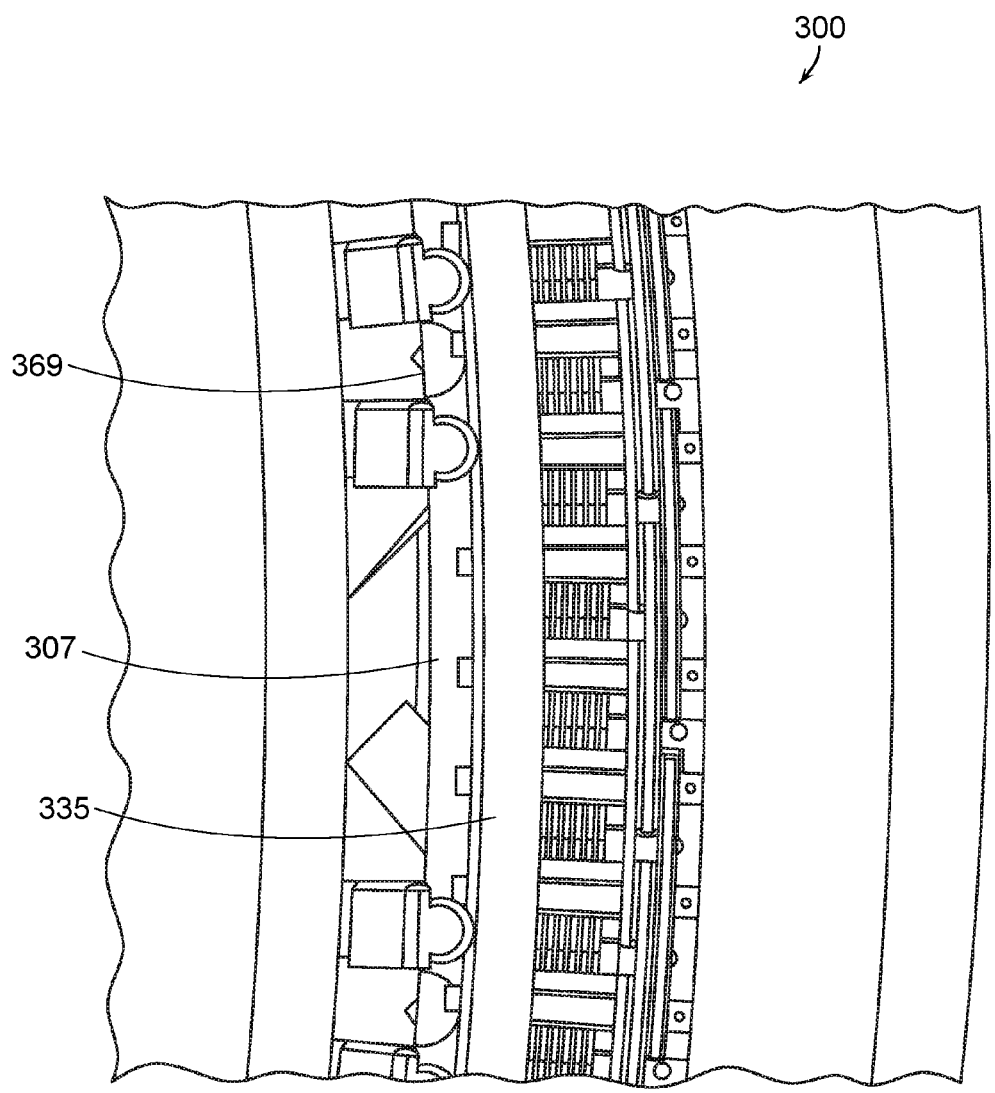
FIGS. 6A and 6B are diagrams of a flexible coupling according to one embodiment of the present invention.
Figure 6B:
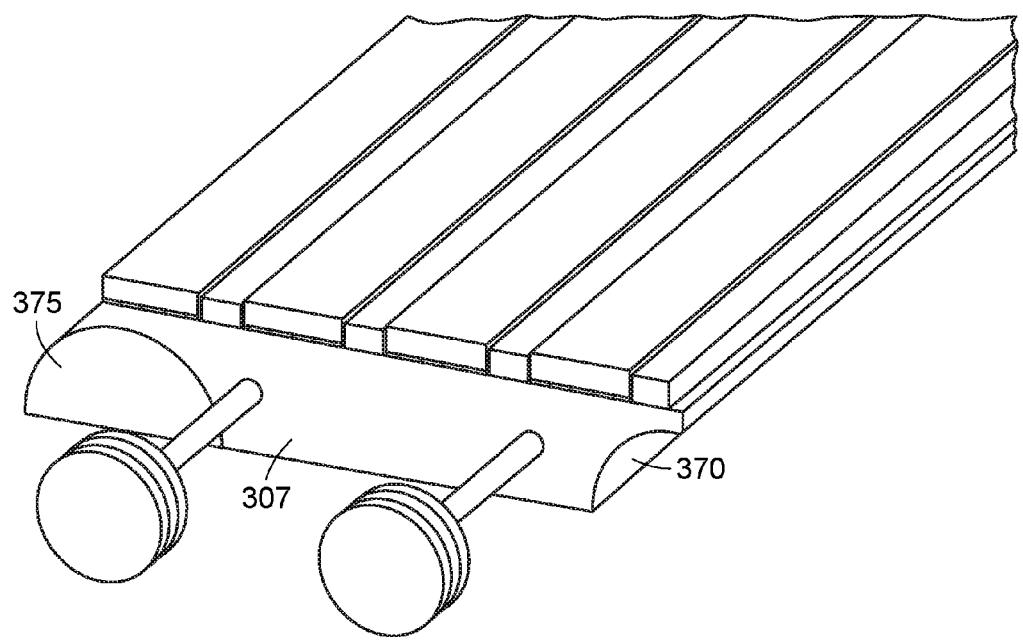

In a convenient embodiment shown in FIGS. 6A and 6B, each of the rotor section 307s is flexibly coupled end-to-end by a flexible coupling 369 between each pair of the rotor sections 307. The flexible coupling 369 comprises a rotor pivot joint 370 and rotor pivot pin 375, as best depicted in FIG. 6B. In other embodiments, the flexible coupling 369 may take on a ball-socket or hinge-type configuration as required by design. The flexible couplings allow for articulation between adjacent rotor sections 307 and allow each of the rotor sections 307 to precisely ride the rail 335. This configuration also allows for the steel contact surfaces between rotor sections to be touching allowing for high magnetic permeability between each section (a necessity for proper operation of some types of electro-mechanical energy converters). In this embodiment, the flexible coupling 369 is designed to efficiently couple magnetic flux from one rotor section 307 to the next rotor section 307.

In another embodiment, there is a physical gap between each of the rotor sections 307. The physical gap allows for clearance between adjacent rotor sections 307 as they ride the rail 335. In this embodiment, each of the rotor sections 307 is independently attached to the drive hub 315.

Figure 7B:
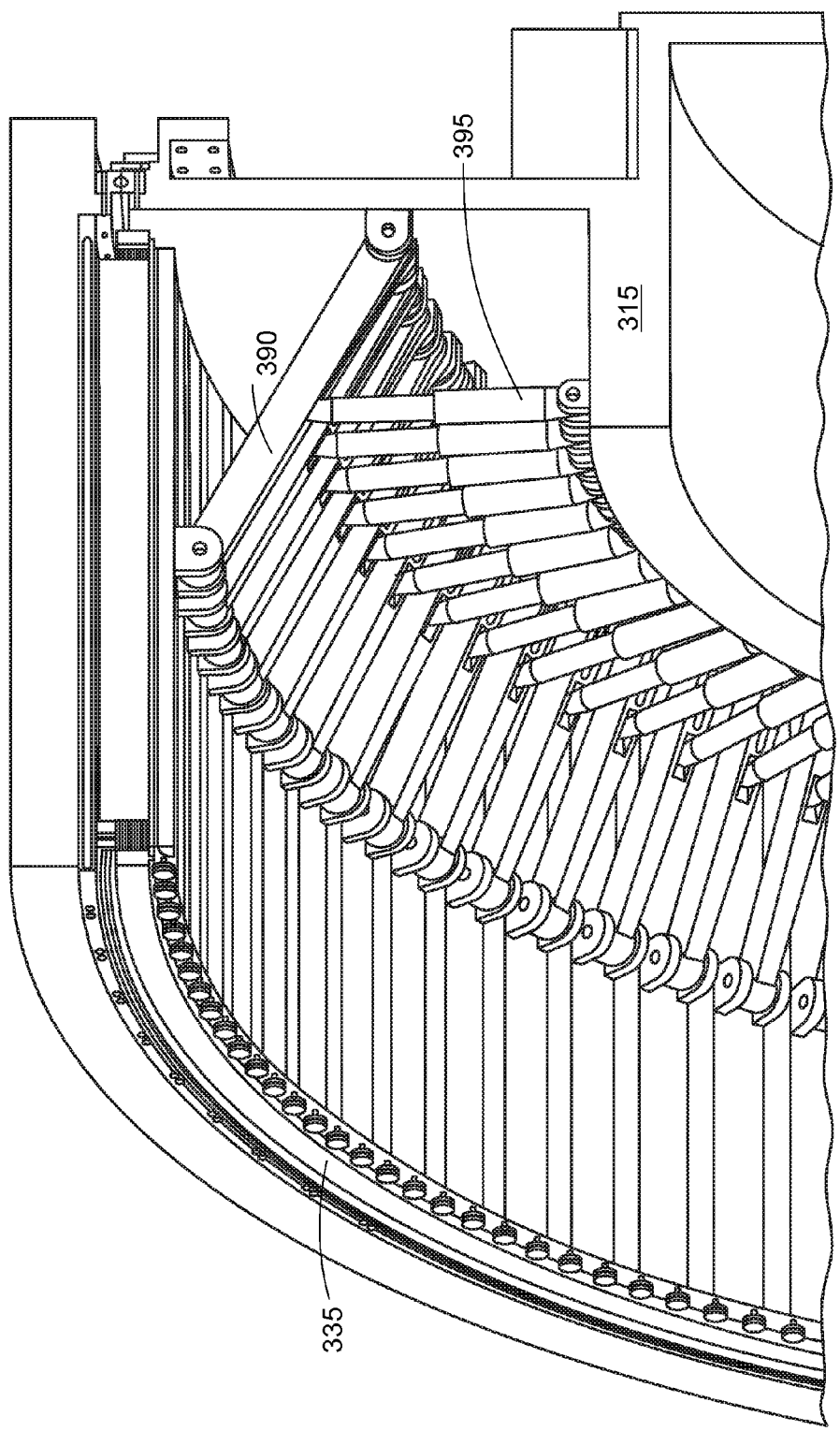

FIGS. 7A-C show the rotor sections 307 flexibly coupled to the drive hub 315. The drive hub 315 transfers torque to or from the rotor sections 307. The figures also show the rotor sections 307 are held in an outward radial direction by a radial force (Fr) such that each rotor section 307 is forced tightly against the rail 335. By holding each rotor section 307 (and in some embodiments, the rotor wheels 340) of FIG. 5B tight against the rail 335, a small air gap 312 between the rotor section 307 and stator section 311 is maintained. The following are examples of configurations in which the rotor sections 307 are flexibly coupled to the drive hub 315 and examples of configurations for producing the radial force (Fr).

In the example configuration depicted in FIG. 7A, each rotor section 307 is held tightly against the rail 335 by a rotor holding spring 380. The rotor holding spring 380 pushes against the drive hub 315 to push the rotor section 307 against the rail 335. The springs 380 are located between drive dogs 308 that are fixed to the rotor section 307. The drive dogs 308 transfer toque to or from the rotor sections 307 and the drive hub 315. In a convenient embodiment, the rotor holding spring 380 is folded in an accordion-like configuration and slid between the rotor section 307 and drive hub 315. The spring 380 may be made of fiber reinforced plastic (FRP) or other metallic or composite material.

In another example configuration depicted in FIGS. 7B and 7C, a drive arm 390 and arm spring 395 are used to both force the rotor sections 307 (and in some embodiments, the rotor wheels 340) tightly against the rail 335 and to transfer torque to or from the rotor sections 307 and the drive hub 315.

In yet another example configuration in which the stator and/or rotor are magnetic is a permanent magnet or electromagnet, the magnetic attraction between the stator and rotor provides the radial force to hold each rotor section 307 (and in some embodiments, the rotor wheels 340) tight against the rail 335. This configuration may be used in conjunction with any one of the other embodiments shown in FIG. 7A (rotor holding spring and drive dog) and FIGS. 7B and 7C (drive arm and arm spring). In such a combination, each component need only provide some a portion of the radial force, which may lead to an optimization of cost and materials.

In a convenient embodiment, at least one of the components of the foregoing configurations shown in FIGS. 7A-7C is of a sectional design allowing removal of an individual rotor section 307. Removal of rotor section 307 may be accomplished by using one or more actuators or forcing cylinders 395 shown in FIG. 7B to controllably remove the rotor section 307 from the rotor 305. Similarly, once the rotor sections 307 are removed, the stator section 311 can be removed using the same apparatus shown in FIG. 7B.

In addition to a reduction in air gap 312 leading to overall reduction in cost, the electro-mechanical energy converter 300 is modular for accommodating variations arising from use of the electro-mechanical energy converter 300, such as load, and thermal expansion and contraction, as well as for enabling repairs. For example, as described above, the rotor 305 is designed in a plurality of rotor sections 307 to allow for dimensional variance due to loading and thermal expansion/contraction. The sectional design of the rotor 305 also allows for mechanical tolerance variation, assembly, disassembly, maintenance, and repair. In a convenient embodiment, the stator 310 also is designed in sections 311 to allow for dimensional variance due to loading and thermal expansion/contraction. The sectional design of the stator 310 also allows for mechanical tolerance variation, assembly, disassembly, maintenance, and repair. Other components of the electro-mechanical energy converter may also be designed in sections.

The design of the electro-mechanical energy converter 300 therefore enables repair of discrete rotor sections 307 and/or stator sections 311 without requiring removal of the entire electro-mechanical energy converter 300 from a machine. This is of particular utility for the WEC 105 of FIG. 1A and tunnel boring machine 205 of FIG. 2 for which removal and replacement of their respective electro-mechanical energy converter, 115 and 215, is a costly and time consuming procedure.

Returning now to the structural elements of the electro-mechanical energy converter 300, as discussed above with regard to FIGS. 3A and 3B, the electro-mechanical energy converter 300 includes the structural sleeve 330 that encapsulates the components of the electro-mechanical energy converter 300, such as the rotor 305 and stator 310, and provides a frame for these elements. The structural sleeve 330 may be inserted into and/or bonded to a machine, such as WEC 105 of FIG. 1A and tunnel boring machine 205 of FIG. 2.

The choice of material for the structural sleeve 330, and other components for that matter, depends largely on the operating environment of the machine of which the electro-mechanical energy converter 300 is a part. For example, given that the WEC 10 operates in a high salinity environment (viz., the ocean), fiber reinforced plastic (FRP), also known as fiberglass, is a suitable material for manufacturing the structural sleeve 330. Of course, other materials such as aluminum, steel, other metal alloys, and composites are possible.

Figure 8A:
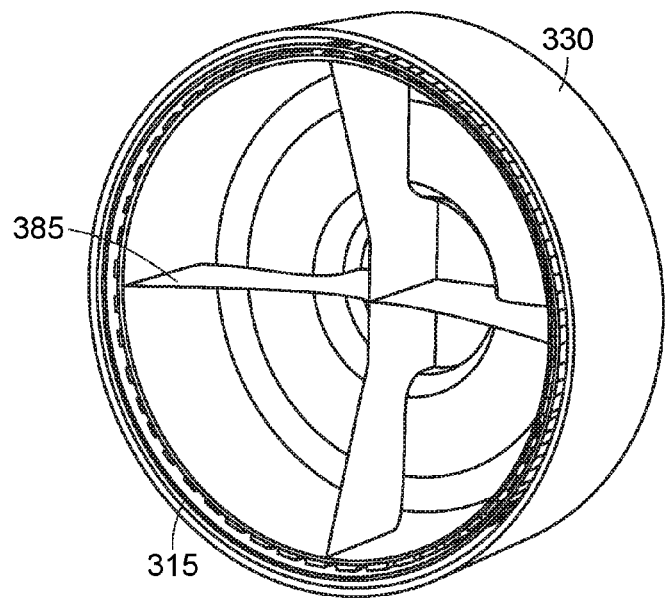
FIGS. 8A and 8B are diagrams a drive hub according to the example embodiments of the present invention.
Figure 8B:
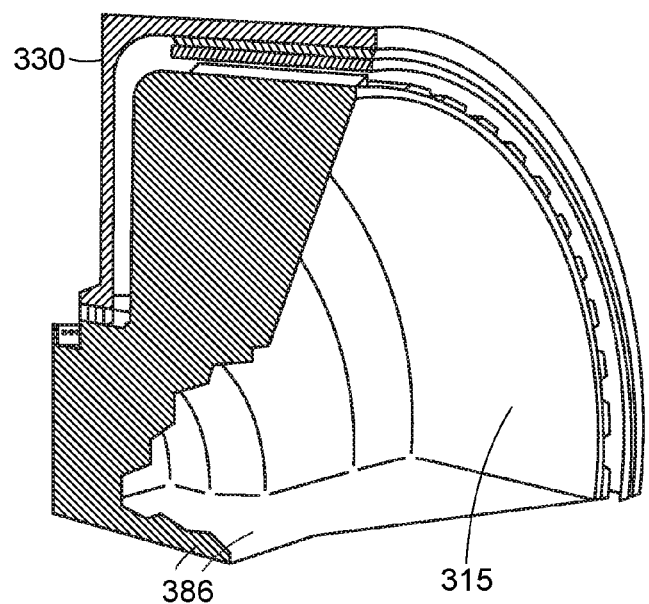

Some of the components of the electro-mechanical energy converter 300 may be designed to withstand high torque. For example, for added rigidity, the drive hub 315 may incorporate one or more stiffeners 385 (as shown in FIG. 8A) and/or a "stepped" profile 386 (as shown in FIG. 8B). In another example, the drive hub 315 includes a central hub, which has a smaller diameter than the drive hub 315, and spokes radiating outward from the central hub and ending at a wall of the drive hub 315. In this "hub and spoke" configuration, there is no material between the spokes. As such, the rotational mass the hub and spoke configuration may be less than the configurations of FIGS. 8A and 8B, which ultimately leads to lower cost and more efficient operation of the electro-mechanical energy converter 300.

Figure 9B:
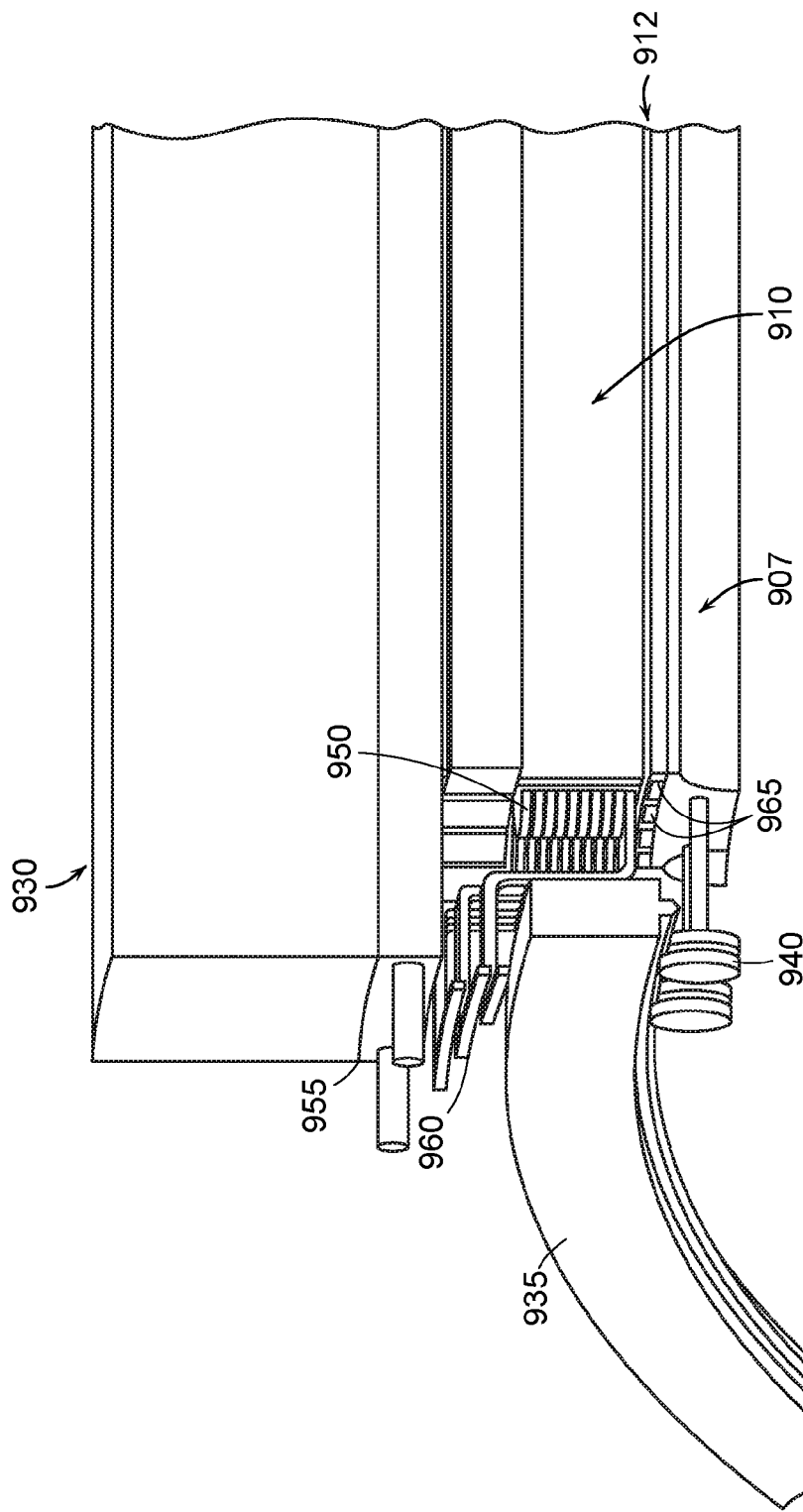
Figure 9C:
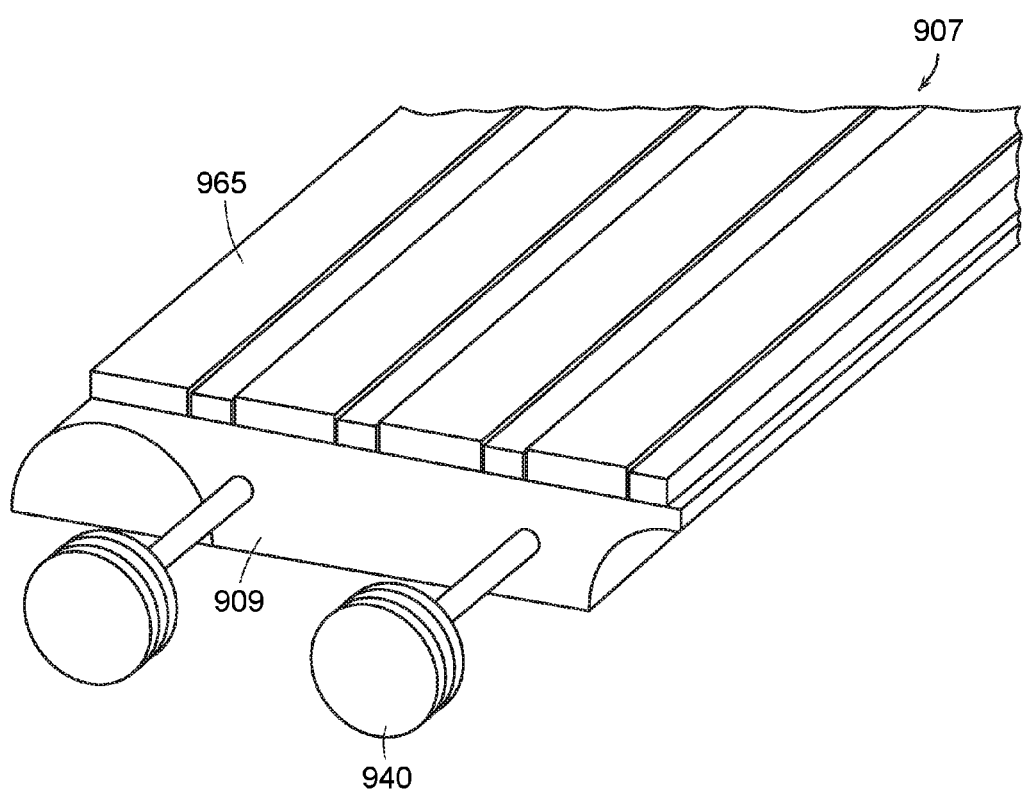

It should be readily apparent that the design and its features described above may be applied to any one of a variety of electro-mechanical energy converters. For example, FIGS. 9A-9C show the foregoing design applied to a permanent magnetic generator 900. In one embodiment, the permanent magnetic generator 900 includes a plurality of rotor sections 907 (one of which is shown) and a plurality of stator sections 911 (one of which is shown). The plurality of rotor sections 907 and plurality of stator sections 911 complete a full 360 degree circumference of the permanent magnetic generator 900.

The permanent magnetic generator 900 further includes a pair of rails 935, and each rail 935 is attached to either end of a generator 900. Each rail 935 is a track that approximates a circle, but need not be a perfect circle. In one embodiment, each of the rotor sections 907 is supported by four wheels 940, two wheels ride on one of the rails 935 and the other two wheels 940 ride on the other rail 935.

As shown in FIG. 9B, each of the stator sections 911 includes a stator back iron that couples magnetic flux from one stator pole to the next to provide a low reluctance flux path. A stator coil 950 converts a changing magnetic field (such as that caused by the rotor sections 907 turning magnets, as described below) into an induced electromotive force and current. A stator coil slot (not shown) located in the stator back iron holds the stator coil 950 in place. A bus bar provides for series or parallel electrical connection between the stator coil phases and output terminals of the generator 900. The output terminals in turn may be connected with a battery(s) to store the generated electricity and/or a transmission line(s) to carry the generated electricity to another location. The generator 900 may also include a cooling jacket 955 attached to the stator as part of a cooling heat exchange system. The cooling jacket 955 may be either air or air cooled.

As shown in FIG. 9C, each of the rotor sections 907 includes a rotor back iron 909 and rotor magnets 965 attached to the rotor back iron 909. The rotor back iron 909 couples magnetic flux from one rotor magnet 965 to the next to provide a low reluctance flux path. The rotor magnet 965 may be surface or embedded magnets attached to the rotor back iron 909. The rotor magnet 965 may be made of several different materials, such as the neodymium-iron-boron, Alnico, samarium-cobalt, iron-ferrite. Because the foregoing design provides a small air gap 912, lower cost magnets such as iron-ferrite and Alnico may be used in manufacturing the permanent magnetic generator 900.

In an electro-mechanical energy converting process, as the rotor sections 907 travel around the rails 935, a time varying magnetic field with respect to the stator coil 950 is created. The stator coils 950 convert the changing magnetic field into electricity.

In keeping with the modular design enabling mechanical tolerance variation, assembly, disassembly, maintenance, and repair, as described above, in a convenient embodiment, the stator coils 950 and bus bar connections 960 are removable to allow repair or troubleshooting of discrete stator sections 911. Additionally, the stator coils 950 and bus bar 960 are located outside of the rails 935 to allow for accessibility for assembly, disassembly, maintenance, and repair.

The stator and rotor sections of the design (e.g., the rotor sections 307 and stator sections 311 of FIGS. 5A and 5B) are adapted to accommodate a particular type and/or electromagnetic design of an electro-mechanical energy converter. For example, in some cases each of the stator sections is magnetically coupled to another stator section and each of the rotor sections is magnetically coupled to another rotor section. In other cases, each of the stator sections is magnetically coupled to another stator section while each of the rotor sections is not magnetically coupled to another rotor section. In yet other cases, each of the stator sections is not magnetically coupled to another stator section while each of the rotor sections is magnetically coupled to another rotor section. In still yet others cases, each of the stator sections is not magnetically coupled to another stator section and each of the rotor sections is not magnetically coupled to another rotor section.

In addition to the wave energy converter 105 of FIG. 1A and the tunnel boring machine 205 of FIG. 2, there are other industry applications for low speed and high torque, such as a tram bull wheel drive, Ferris wheel, low speed wind energy conversion, large turrets/tables used for machining and equipment handling, and very large turrets (VLT) used for the offshore oil and gas industry.

As discussed above, increasing the diameter of electro-mechanical energy converter increases both the air gap magnetic flux speed and for a fixed amount of electromagnetic material, an increased diameter also increases the drive shaft torque. Increasing flux speed by increasing the diameter produces the same effect as increasing rotational speed and has a proportional effect on cost reduction. Conventional industrial solutions for large-diameter electro-mechanical energy converters typically require a large air gap (5 mm to 10 mm) which increases the volume requirements and cost of electromagnetic materials. These large air gaps are required to allow for mechanical clearance between stator and rotor that are paired in a large diameter electro-mechanical energy converter. Conventional electro-mechanical energy converters are approximately 6 m in diameter and become increasingly expensive to manufacture as the size and diameter increases.

The diameter of electro-mechanical energy converter 300, according to the examples described herein, can be increased to 10 m or more, which exceeds conventional technologies.

A large diameter increases torque and allows for reduced rotor 305 and stator 310 materials for the same torque rating. This is because the Machine torque (T)=Magnetic shear force (F)×machine radius (r). For the equation T=F×r and an increased radius (r), the same torque (T) can be achieved by using less magnetic force (F) and consequently less magnetic materials.

Increasing the machine diameter will increase the linear speed of the rotor magnetic flux and allow for an increased EMF, which can be used to reduce magnetic materials and machine costs. The equation Voltage(V)=N×A(dB/dt) [1] describes the voltage produced as a function of the number of stator coil turns (N), the area of magnetic circuit flux (A), and the time rate of change of magnetic flux density (dB/dt). The term dB/dt is directly proportional ($\propto$) to linear magnet speed at the surface of the outer rotor diameter; dB/dt$\propto$ωr (P/2π) [2] [2]; where ω is the radial machine speed, r is the machine radius, and P is the number of magnetic poles in the machine. According to [2], for a given machine speed (ω), an increase in machine diameter or radius (r) will increase the rate of change of flux density (dB/dt) and as shown in [1] a reduction in the required magnet surface area (A) and/or a reduction in the number of stator coil turns (N). A reduction in N or A will translate into a reduction in machine cost by making the machine shorter in the axial direction or by reducing the number of stator coil turns.

It is noted that the foregoing examples have been provided merely for the purpose of explanation and are in no way to be construed as limiting the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A mechanical assembly for maintaining an air gap between a stator and rotor in an electro-mechanical energy converter, the assembly comprising:
    a structural sleeve;
    a plurality of stator sections attached to an inner surface of the structural sleeve;
    a hub enclosed by the structural sleeve and concentric with the structural sleeve;
    a plurality of rotor sections flexibly coupled to the hub and enclosed by the structural sleeve; and
    a rail system positioned within the structural sleeve and concentric with the structural sleeve, the rail system for guiding the rotor sections in a substantially circular path and for defining an air gap between the plurality of stator sections and plurality of rotor sections;

wherein each of the rotor sections is flexibly coupled to the hub by:
a drive dog fixed to the rotor section and adapted for transferring torque between a given rotor section and the hub; and
a holding spring disposed between the given rotor section and the hub, and adapted for providing a radial force pushing against the hub to push the given rotor section against the rail system.

2. The assembly of claim 1 wherein the structural sleeve has a diameter of at least one meter.

3. The assembly of claim 1 wherein each of the stator sections is removably attached to the inner face of the structural sleeve.

4. The assembly of claim 1 wherein each of the stator sections is coupled to another stator section.

5. The assembly of claim 1 wherein the inside of the hub forms a cavity and stiffener.

6. The assembly of claim 1 wherein the hub includes a central hub having a diameter less than the hub and a plurality of spokes extending radially from the central hub to an edge defining the circumference of the hub.

7. A mechanical assembly for maintaining an air gap between a stator and rotor in an electro-mechanical enemy converter, the assembly comprising:
a structural sleeve;
a plurality of stator sections attached to an inner surface of the structural sleeve;
a hub enclosed by the structural sleeve and concentric with the structural sleeve;
a plurality of rotor sections flexibly coupled to the hub and enclosed by the structural sleeve; and
a rail system positioned within the structural sleeve and concentric with the structural sleeve, the rail system for guiding the rotor sections in a substantially circular path and for defining an air clap between the plurality of stator sections and plurality of rotor sections;
wherein each of the rotor sections is flexibly coupled to the hub by:
a drive arm pivotably attached to the hub at an end and pivotably attached to a given rotor section at another end, the drive arm being adapted for transferring torque between a given rotor section and the hub; and
an arm spring pivotably attached to the hub at an end and pivotably attached to an associated drive arm at another end, the arm spring being adapted for providing a radial force pushing against the hub to push the associated drive arm and given rotor section against the rail system.

8. The assembly of claim 1 wherein each of the rotor sections includes a plurality of wheels for riding the rail system.

9. The assembly of claim 1 wherein the rail system is mounted to any one of the structural sleeve and stator.

10. The assembly of claim 1 wherein the air gap between the plurality of stator sections and plurality of rotor sections is between 0.25 millimeters to 5 millimeters.

11. The assembly of claim 1 further comprising a flexible coupling between each pair of rotor sections for: i) enabling each of the rotor sections to independently follow the rail system, ii) releasably connecting a given rotor section to an adjacent rotor section, and iii) magnetically coupling the rotor sections, the flexible coupling being any one of a pin and corresponding pivot; hinge; and ball and corresponding socket.

12. The assembly of claim 1 further comprising a rotatable float drivingly attached to the hub for converting wave surge and heave into torque used to generate electricity.

13. The assembly of claim 1 wherein the plurality of stator sections and plurality of rotor sections are paired in any one of alternating current (AC) electric motor, direct current (DC) electric motor, AC electric generator, and DC electric generator.

14. A method for maintaining an air gap between a stator and rotor in an electromechanical energy converter, the method comprising:
providing a structural sleeve;
attaching a plurality of stator sections to an inner surface of the structural sleeve;
providing a hub, the hub being enclosed by the structural sleeve and concentric with the structural sleeve;
flexibly coupling a plurality of rotor sections to the hub, the plurality of rotor sections being enclosed by the structural sleeve; and
positioning a rail system within the structural sleeve to guide the rotor sections in a substantially circular path and to define an air gap between the plurality of stator sections and plurality of rotor sections, the rail system being concentric with the structural sleeve;
wherein each of the rotor sections is flexibly coupled to the hub by:
a drive dog fixed to the rotor section and adapted for transferring torque between a given rotor section and the hub; and
a holding spring disposed between the given rotor section and the hub, and adapted for providing a radial force pushing against the hub to push the given rotor section against the rail system.

15. The assembly of claim 7 wherein the structural sleeve has a diameter of at least one meter.

16. The assembly of claim 7 wherein each of the stator sections is removably attached to the inner face of the structural sleeve.

17. The assembly of claim 7 wherein each of the stator sections is coupled to another stator section.

18. The assembly of claim 7 wherein the inside of the hub forms a cavity and stiffener.

19. The assembly of claim 7 wherein the hub includes a central hub having a diameter less than the hub and a plurality of spokes extending radially from the central hub to an edge defining the circumference of the hub.

20. The assembly of claim 7 wherein each of the rotor sections includes a plurality of wheels for riding the rail system.

21. The assembly of claim 7 wherein the rail system is mounted to any one of the structural sleeve and stator.

22. The assembly of claim 7 wherein the air gap between the plurality of stator sections and plurality of rotor sections is between 0.25 millimeters to 5 millimeters.

23. The assembly of claim 7 further comprising a flexible coupling between each pair of rotor sections for: i) enabling each of the rotor sections to independently follow the rail system, ii) releasably connecting a given rotor section to an adjacent rotor section, and iii) magnetically coupling the rotor sections, the flexible coupling being any one of a pin and corresponding pivot; hinge; and ball and corresponding socket.

24. The assembly of claim 7 further comprising a rotatable float drivingly attached to the hub for converting wave surge and heave into torque used to generate electricity.

25. The assembly of claim 7 wherein the plurality of stator sections and plurality of rotor sections are paired in any one of alternating current (AC) electric motor, direct current (DC) electric motor, AC electric generator, and DC electric generator.

26. A method for maintaining an air gap between a stator and rotor in an electromechanical energy converter, the method comprising:
providing a structural sleeve;
attaching a plurality of stator sections to an inner surface of the structural sleeve;
providing a hub, the hub being enclosed by the structural sleeve and concentric with the structural sleeve;
flexibly coupling a plurality of rotor sections to the hub, the plurality of rotor sections being enclosed by the structural sleeve; and
positioning a rail system within the structural sleeve to guide the rotor sections in a substantially circular path and to define an air gap between the plurality of stator sections and plurality of rotor sections, the rail system being concentric with the structural sleeve;
wherein each of the rotor sections is flexibly coupled to the hub by:
a drive arm pivotably attached to the hub at an end and pivotably attached to a given rotor section at another end, the drive arm being adapted for transferring torque between a given rotor section and the hub; and
an arm spring pivotably attached to the hub at an end and pivotably attached to an associated drive arm at another end, the arm spring being adapted for providing a radial force pushing against the hub to push the associated drive arm and given rotor section against the rail system.

* * * * *